United States Patent
Cradick et al.

(10) Patent No.: US 9,396,157 B2
(45) Date of Patent: Jul. 19, 2016

(54) STREAM APPLICATION PERFORMANCE MONITORING METRICS

(75) Inventors: Ryan K. Cradick, Oronoco, MN (US);
Michael D. Pfeifer, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 13/218,545

(22) Filed: Aug. 26, 2011

(65) Prior Publication Data

US 2013/0054779 A1 Feb. 28, 2013

(51) Int. Cl.
*G06F 15/173* (2006.01)
*G06F 17/30* (2006.01)
*H04L 12/26* (2006.01)
*H04L 29/06* (2006.01)
*H04L 12/24* (2006.01)

(52) U.S. Cl.
CPC ........ *G06F 15/173* (2013.01); *G06F 17/30516* (2013.01); *H04L 41/22* (2013.01); *H04L 43/08* (2013.01); *H04L 43/12* (2013.01); *H04L 65/607* (2013.01)

(58) Field of Classification Search
CPC .................. G06F 2212/7207; G06F 17/30516; G06F 17/30598; G06F 9/30181; G06F 2201/86; G06F 2201/88; H04L 65/60; H04L 43/08; H04L 65/607; H04L 67/02; H04L 43/12; H04L 41/14; H04L 47/25; H04L 43/0876; G06K 9/4671
USPC ................... 709/224–227, 223; 707/713–716
See application file for complete search history.

(56) References Cited

U.S. PATENT DOCUMENTS

| | | | | |
|---|---|---|---|---|
| 7,953,856 | B2 * | 5/2011 | Pendarakis et al. | 709/226 |
| 8,078,609 | B2 * | 12/2011 | Black | 707/713 |
| 8,386,466 | B2 * | 2/2013 | Park et al. | 707/713 |
| 8,391,164 | B2 * | 3/2013 | Cormode et al. | 370/250 |
| 2007/0250538 | A1 | 10/2007 | Moore | |
| 2008/0126534 | A1 * | 5/2008 | Mueller | G06F 11/3409 709/224 |
| 2008/0162590 | A1 * | 7/2008 | Kundu et al. | 707/202 |
| 2009/0006310 | A1 * | 1/2009 | Tanaka et al. | 707/1 |
| 2009/0063904 | A1 * | 3/2009 | Abrashkevich et al. | 714/38 |

(Continued)

FOREIGN PATENT DOCUMENTS

| | | | |
|---|---|---|---|
| CN | 1859233 A | 11/2006 | |
| CN | 101933018 A | 12/2010 | |

OTHER PUBLICATIONS

Feng Tian, David J. DeWitt, Tuple ROuting Strategies for Distributed Eddies, 2003, Department of Computer Sciences, Univeristy of Wisconsin, Madison.*

International Search Report and Written Opinion of the ISA dated Nov. 8, 2012—International Application No. PCT/IB2012/053376.

*Primary Examiner* — Chirag R Patel
(74) *Attorney, Agent, or Firm* — Patterson & Sheridan, LLP

(57) ABSTRACT

Techniques are disclosed for calculating performance metrics associated with a data stream. A processing element configured to process data tuples flowing through a stream-based computing system receives data tuples via the data stream. Each of the one or more tuples is processed at the processing element, and each of the one or more tuples are associated with metadata that includes information related to the processing of the tuple by the processing element. Performance metrics are then calculated for the data stream based on the metadata associated with the one or more tuples.

18 Claims, 5 Drawing Sheets

(56) References Cited

U.S. PATENT DOCUMENTS

| | | |
|---|---|---|
| 2009/0094195 A1 | 4/2009 | Black |
| 2010/0229178 A1* | 9/2010 | Ito .................................. 718/104 |
| 2011/0167148 A1 | 7/2011 | Bodziony et al. |
| 2011/0314019 A1* | 12/2011 | Jimenez Peris et al. ....... 707/737 |
| 2012/0047505 A1 | 2/2012 | Branson et al. |
| 2012/0158953 A1* | 6/2012 | Barnes et al. .................. 709/224 |
| 2012/0317276 A1* | 12/2012 | Muniraju ....................... 709/224 |

\* cited by examiner

STREAM APPLICATION PERFORMANCE MONITORING METRICS

BACKGROUND

Computer databases have become extremely sophisticated, e.g., the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems, where products are available and allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

Measuring performance of a stream-based application enables one to determine whether the stream-based application is operating in an optimized manner. In a stream-based application, "tuples" of data are received via a data stream and are routed across processing elements (PEs) that perform operations on the tuples and then forward the tuples to a different processing element for further processing. One technique of measuring performance of a stream-based application involves determining a throughput of the tuples received via the datastream, e.g., a particular stream-based application may be considered to be efficient when one hundred tuples per minute are fully processed by one or more PEs. Unfortunately, this metric alone cannot be used to indicate whether the stream-based application is running in an optimized manner since various conditions affect the rate at which tuples arrive in the data stream. For example, the number of tuples received via a Really Simple Syndication (RSS) feed (i.e., a data stream) varies according to the time of day since news articles are often generated more frequently at particular times of the day, e.g., in the morning and in the evening. As a result, a user might be falsely alerted that the stream-based application is experiencing performance issues even when the stream-based application is operating in an optimized manner.

SUMMARY

One embodiment of the invention provides a technique for calculating performance metrics associated with a data stream. The technique involves the steps of receiving, at a first processing element configured to process data tuples flowing through the stream-based computing system, one or more tuples associated with a first data stream, processing each of the one or more tuples at the first processing element, associating each of the one or more tuples with metadata that includes information related to the processing of the tuple by the first processing element, calculating performance metrics based on the metadata associated with the one or more tuples, and displaying the calculated performance metrics via a user interface on a display device.

Another embodiment of the invention provides a system that comprises a plurality of compute nodes, each comprising a processor and a memory, where the memory stores a stream performance manager which, when executed the compute node, is configured to perform an operation for calculating performance metrics associated with a data stream. The operation comprises the steps of receiving, at a first processing element configured to process data tuples flowing through the stream-based computing system, one or more tuples associated with a first data stream, processing each of the one or more tuples at the first processing element, associating each of the one or more tuples with metadata that includes information related to the processing of the tuple by the first processing element, calculating performance metrics based on the metadata associated with the one or more tuples, and displaying the calculated performance metrics via a user interface on a display device.

Further embodiments of the invention provide a non-transitory computer readable storage medium that includes instructions for causing a computer system carry out on or more of the methods set forth above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
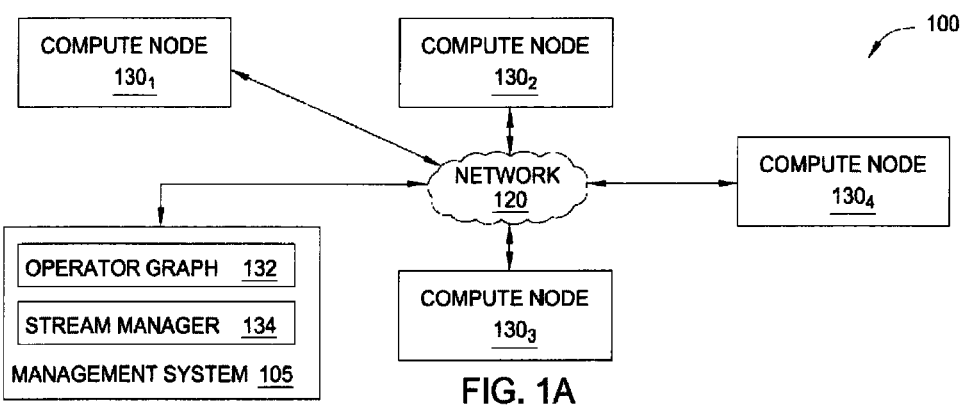
FIGS. 1A-1B illustrate a computing infrastructure configured to execute a stream database application, according to an embodiment of the invention.

Embodiments of the invention provide techniques for determining various performance metrics associated with a stream-based application. In context of this disclosure, a stream-based application includes one or more processing elements that receive a data stream, where the data stream delivers tuples to the one or more processing elements. Each processing element may generally receive a tuple (or tuples) and emit a tuple (or tuples) to other processing elements. The emitted tuples may be unchanged by the processing element, but new or modified tuples may be generated as well. Tuples included in the data stream are tagged with metadata as they are processed by the one or more processing elements, which enable a streams performance manager to identify the various performance metrics associated with the data stream. As a result, the various performance metrics may be used to determine the performance of the stream-based application and identify potential processing bottlenecks in the stream-based application. Moreover, adjustments to the stream-based application may automatically be made based on the various performance metrics to alleviate the processing bottlenecks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1B:
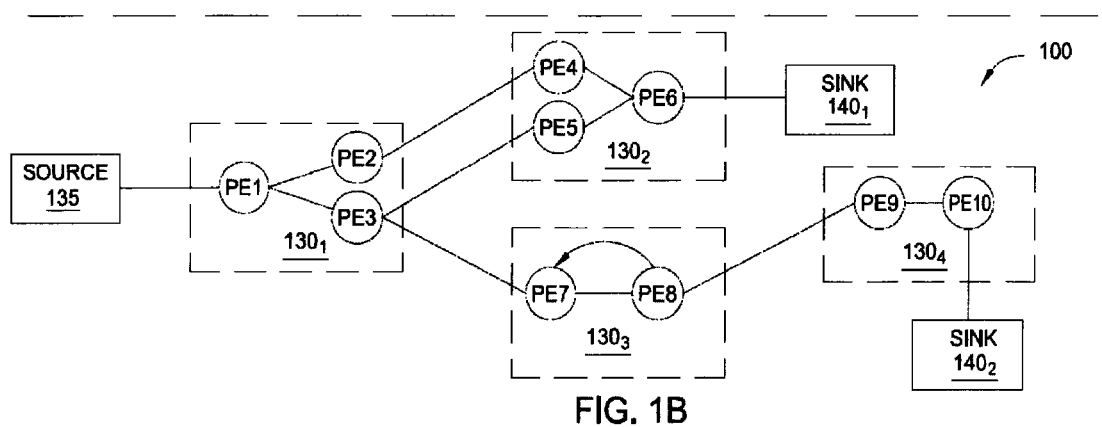

FIGS. 1A-1B illustrate a computing infrastructure 100 configured to execute a stream-based application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. The operator graph 132 represents a stream-based application beginning from of one or more source processing elements (PEs) through to one or more sink PEs. Data elements flow into a source PE of a stream-based application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on the received tuple, including, e.g., writing to database tables or performing other database operations such as data joins, splits, reads, etc., as well as performing other data analytic functions or operations.

The stream manager 134 may be configured to monitor a stream-based application running on the compute nodes $130_{1-4}$ as well as change the structure of the operator graph 132. For example, the stream manager 134 may move processing elements (PEs) from one compute node 130 to another, e.g., to manage the processing loads of the compute nodes 130 in the computing infrastructure 100. Further, stream manager 134 may control the stream-based application by inserting, removing, fusing, un-fusing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at PE1, which reads from source 135 and ends at PE6 and PE10, which both write to sink $140_{1-2}$. Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6, which writes to sink $140_1$. Similarly, data tuples flowing from PE3 to PE5 also reach sink PE6, which writes to sink $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which emits tuples processed by sink PE10, which writes to sink $140_2$.

Figure 2:
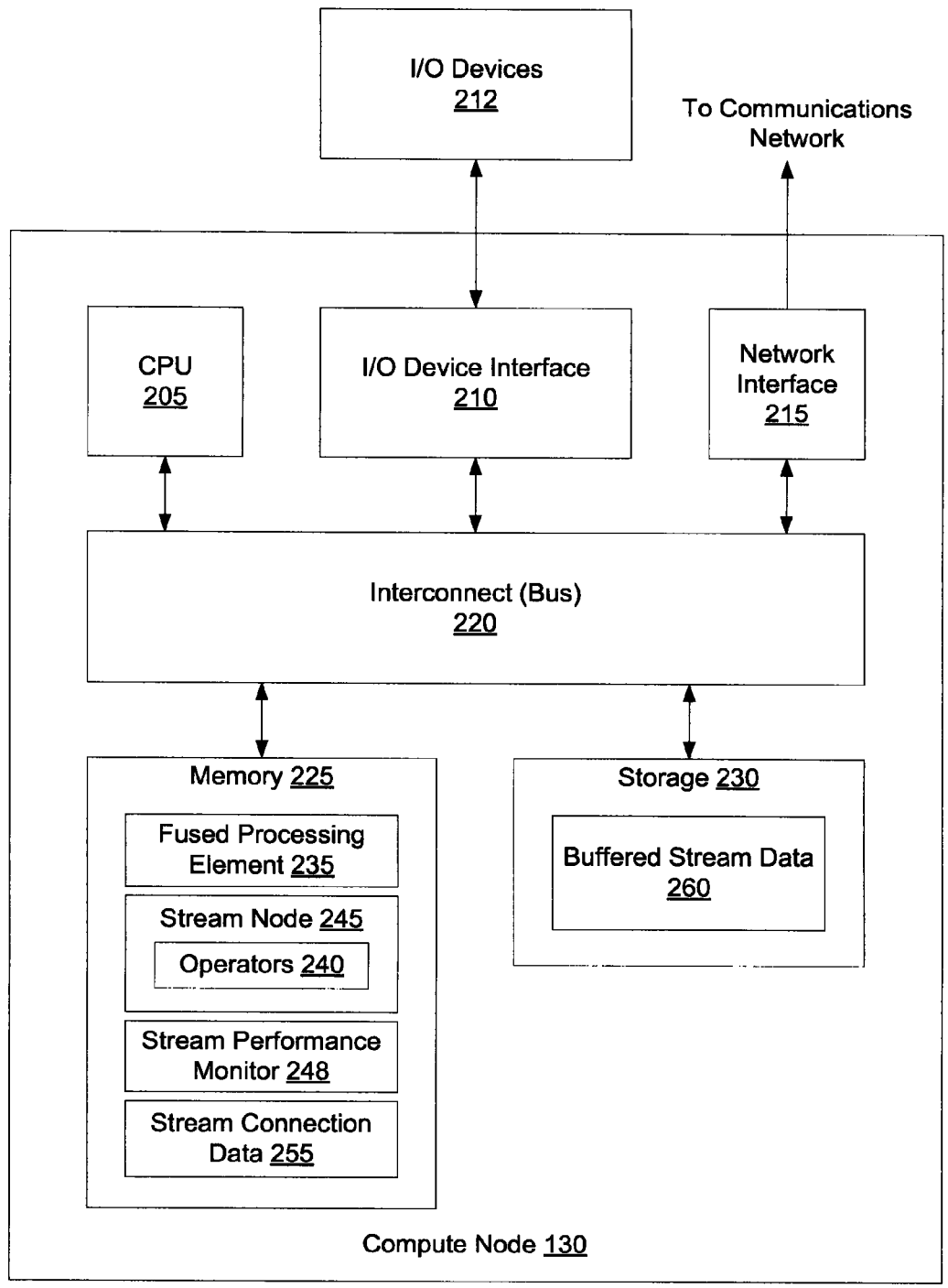
FIG. 2 illustrates a compute node, according to an embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a fused processing element (PE) 235, a stream node 245, stream performance monitor 248 and stream connection data 255. The stream node 245 includes a collection of operators 240. Each operator 240 may provide a small chunk of executable code configured to process data flowing into a processing element (e.g., PE 235) and to emit data to other operators 240 in that PE and to other PEs in the stream-based application. Such PEs may be on the same compute node 130 or on other compute nodes accessed over the data communications network 120.

The stream performance monitor 248 is configured to tag tuples received via a data stream with metadata that enables a stream performance manager, described in detail below in conjunction with FIGS. 3-5, to identify various performance metrics associated with the data stream. The stream connection data 255 represents the connections between PEs on compute node 130 (e.g., a TCP/IP socket connection), as well as connections to other compute nodes 130 with upstream and or downstream PEs in the stream-based application, also via TCP/IP sockets (or other inter-process data communication mechanisms).

Buffered stream data 260 represents a storage space for data flowing into the compute node 105 from upstream processing elements (or from a data source for the stream-based application). For example, buffered stream data may include data tuples waiting to be processed by a processing element, such as PE 235. Buffered stream data 260 may also store the results of data processing performed by PE 235 that will be sent to downstream processing elements (or load shed at downstream processing elements).

Figure 3:
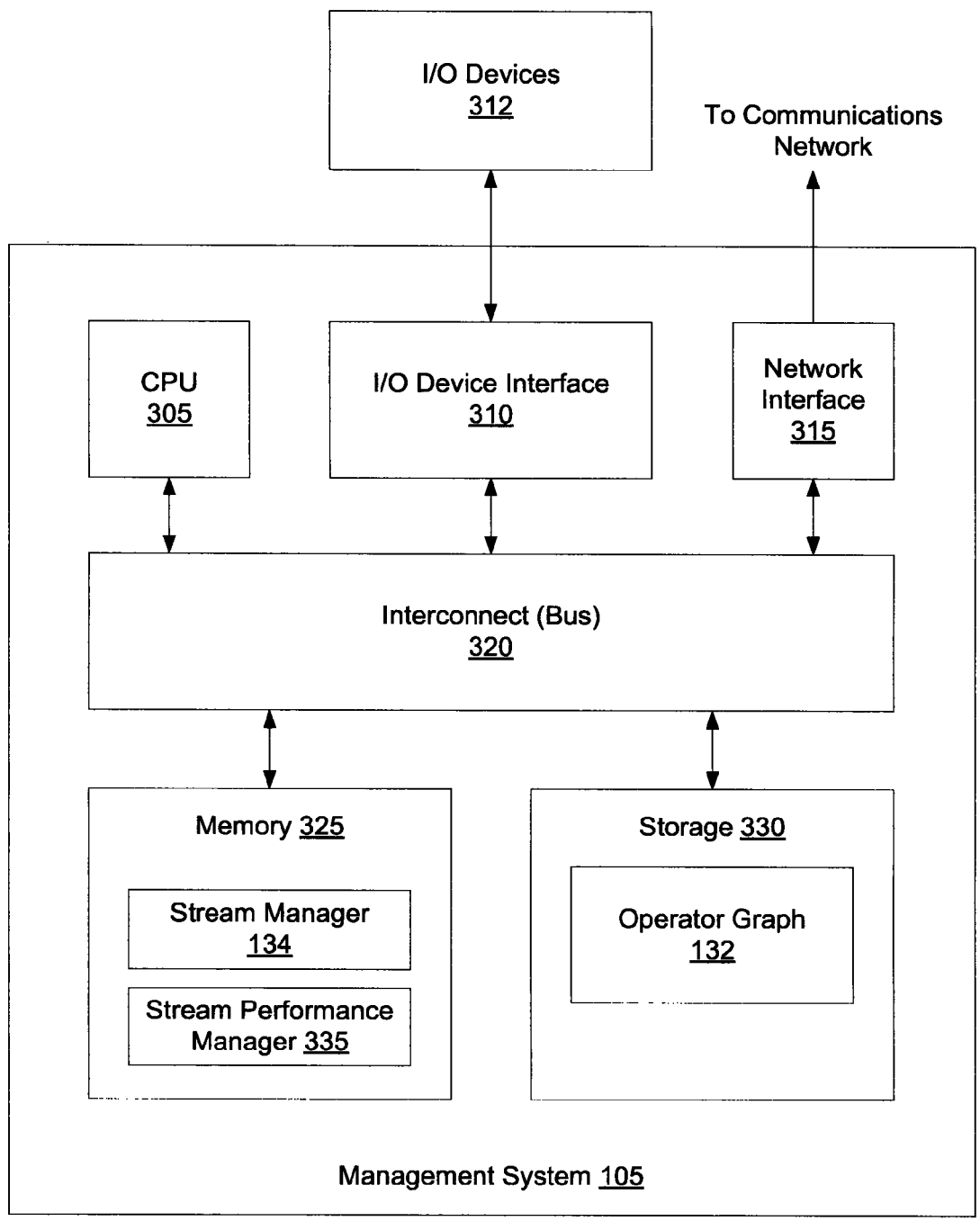
FIG. 3 illustrates a management system, according to an embodiment of the invention.

FIG. 3 is a more detailed view of the management system 105 of FIG. 1, according to one embodiment of the invention. As shown, management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display, and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134 and a stream performance manager 335. The storage 330 includes an operator graph 132. The operator graph 132 represents a stream-based application beginning from of one or more source processing elements (PEs) through to one or more sink PEs. In one embodiment, the stream manager 134 monitors a stream-based application running on the compute nodes $130_{1-4}$ and changes the structure of the operator graph 132 as needed. For example, the stream manager 134 may move processing elements (PEs) from one compute node 130 to another, e.g., to manage the processing loads of the compute nodes 130 in the computing infrastructure 100. Further, stream manager 134 may control the stream-based application by inserting, removing, fusing, un-fusing, or otherwise modifying the processing elements (or what data-tuples flow to the processing elements) running on the compute nodes $130_{1-4}$.

Stream performance manager 335 is configured to analyze the metadata that is tagged to tuples by using one or more stream performance monitors 248. Through such analysis, the stream performance manager 335 calculates useful performance metrics associated with the data stream in which tuples are received. For example, the stream performance manager 335 may be configured to determine a total amount of time that it takes for a tuple to travel between two specific PEs included in an operator graph, to determine a total amount of time that it takes for a tuple to travel between a group of PEs, to determine a total amount of time that it takes for a tuple to travel across all PEs included in an operator graph, and/or to determine a total amount of time that it takes for a tuple to travel across two or more compute nodes. The stream performance manager 335 may also be configured to determine a total number of operators through which a particular tuple travels, to calculate a total number of times that each attribute of the tuple is updated, and/or to identify absolute duplicate or partially duplicate streams in one or more PEs, operator graphs, or compute nodes.

Advantageously, these performance metrics may be used to identify processing inefficiencies within a stream-based application. For example, if a decrease in the throughput of tuples received via a datastream is detected based on one or more of the above performance metrics, further analysis of the attributes of tuples received via the datastream—in conjunction with analysis of how the data is being processed in the stream-based application—can be used by stream manager 134 to automatically cause additional stream paths to be created in attempt to restore the tuple throughput of the datastream. In one example, tuples arriving via the datastream are split on a name attribute of either "RYAN" or "JOHN," which typically results in an even distribution of the tuples through the stream-based application. However, the stream-based application may at some point be overloaded due to an irregular distribution of receiving only tuples having a name attribute "JOHN." In this case, another path to process tuples having the name attribute "JOHN" may be automatically created by, e.g., stream manager 134, to equalize the distribution of tuples in the stream-based application. The updated configuration of the stream-based application is then sampled by stream performance manager 335 to determine whether the updated configuration has alleviated the throughput inefficiencies.

Figure 4:
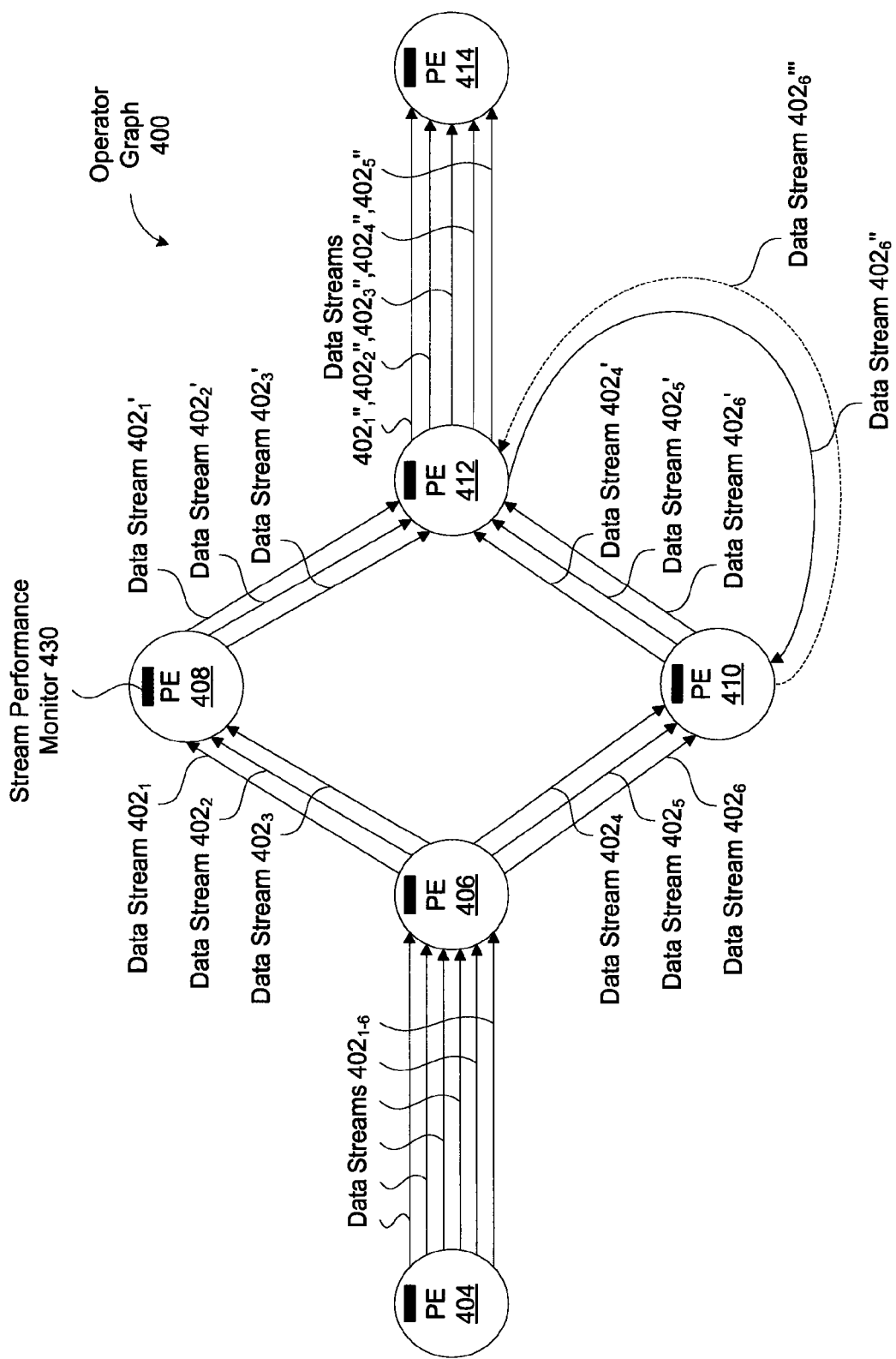
FIG. 4 illustrates an operator graph in which performance metrics associated with one or more data streams are calculated, according to an embodiment of the invention.

FIG. 4 illustrates an operator graph 400 in which performance metrics associated with one or more data streams are calculated, according to an embodiment of the invention. As shown, data streams $402_{1-6}$ flow from PE 404 to PE 406, where PE 406 distributes data streams $402_{1-3}$ to PE 408 for processing and data streams $402_{4-6}$ to PE 410 for processing. As described above, one or more stream performance monitors, such as stream performance monitor 430, are configured to tag tuples received via data streams 402 and processed by PEs 404, 406, 408, 410 and 412 with metadata. In this way, streams performance manager 335 is able to calculate various performance metrics for data streams 402, PEs 404, 406, 408, 410 and 412, operator graph 400, and one or more compute nodes that are executing PEs 404, 406, 408, 410 and 412 (not shown).

In the example illustrated in FIG. 4, when PE 408 and PE 410 process data streams $402_{1-3}$ and data streams $402_{4-6}$, respectively, they are output as data streams $402_{1-3}'$ and data streams $402_{4-6}'$ and forwarded to PE 412 for further processing. When PE 412 processes data streams $402_{1-6}'$, they are output as data streams $402_{1-6}''$, where data streams $402_{1-5}''$ are forwarded to PE 414, and data stream $402_6''$ is "looped back"

to PE 410 for additional processing by PE 410, where PE 410 may optionally output data stream $402_6'''$ to PE 412.

In one embodiment, each of the PEs, e.g., PE 408, under operation of a stream performance monitor 430 associated therewith, is configured to initially tag each tuple received at PE 408 with metadata that includes 1) an identification (ID) number associated with PE 408, 2) an ID number of the operator graph in which PE 408 is included (i.e., operator graph 400), 3) an ID number of the compute node on which the PE 408 is executing (not shown), and 4) a timestamp that indicates a time at which the tuple is received by PE 408. Prior to outputting the processed tuple, PE 408, under operation of the stream performance monitor 430 associated therewith, tags the processed tuple with additional metadata that indicates a current timestamp and the IDs described above. Thus, when the tuple is transmitted to the subsequent PE 412, stream performance manager 335 is able to determine, via a stream performance monitor 430 associated with PE 412, the amount of time for PE 408 to process the tuple.

As described above, the foregoing metadata is used by stream manager 335 to determine a variety of performance metrics. In one example, stream manager 335 determines a total amount of time that it takes for a tuple to travel between two specific PEs included in an operator graph, e.g., PE 404 and PE 412 included in operator graph 400. To make this determination, stream manager 335 retrieves from the tuple's metadata the timestamps associated with the IDs of PE 404 and PE 412 and calculates a difference between the timestamps, where the difference represents the amount of time for the tuple to travel between PE 404 and PE 412.

In another example, stream manager 335 determines a total amount of time that it takes for a tuple to travel between a group of PEs, i.e., three or more PEs included in an operator graph, e.g., PEs 410, 412 and 414. To make this determination, stream manager 335 analyzes the organization of operator graph 400 to determine a starting point and an ending point of the group of PEs, i.e., PE 410 and PE 412, then retrieves from the tuple's metadata the timestamps associated with the IDs of PEs 410 and 412 and calculates a difference between the timestamps, where the difference represents the amount of time for the tuple to travel between the group of PEs 410, 412 and 414.

In another example, stream manager 335 determines a total amount of time that it takes for a tuple to travel across all PEs included in an operator graph, e.g., PEs 404, 406, 408, 410 and 412 included in operator graph 400. To make this determination, stream manager 335 analyzes the organization of operator graph 400 to determine a starting point and an ending point of the operator graph 400, i.e., PE 404 and PE 412, then retrieves from the tuple's metadata the timestamps associated with the IDs of PEs 404 and 412 and calculates a difference between the timestamps, where the difference represents the amount of time for the tuple to travel across operator graph 400.

In another example, stream manager 335 determines a total amount of time that it takes for a tuple to travel across two or more compute nodes (not shown). In one example, PEs 404 and 406 execute on a first compute node, while PEs 408, 410 and 412 execute on a second compute node. To determine the amount of time that it takes for a tuple to travel between the first compute node and the second compute node, stream manager retrieves from the tuple's metadata the timestamps associated with the IDs of the first compute node and the second compute node and calculates a difference between the timestamps, where the difference represents the amount of time for the tuple to travel between the first compute node and the second compute node.

In another example, stream manager 335 determines a total number of operators through which a particular tuple travels. To make this determination, stream manager 335 references the tuple's metadata and parses the timestamps/IDs included therein to establish counts for one or more PEs, operator graphs and compute nodes that process the tuple, where each count indicates a number of times that the associated entity processed the tuple.

Additionally, each of the PEs, e.g., PE 408, under operation of a stream performance monitor 430 associated therewith, is configured to tag each tuple received at PE 408 with metadata that indicates a number of times that each data attribute of the tuple is changed. For example, if a tuple has a first, second and third attribute, and PE 408 updates the first and second attribute of the tuple, then a counter for the first attribute and a counter for the second attribute is incremented. Accordingly, stream performance manager 335 references this metadata to calculate a total number of times that each attribute of the tuple is updated when the tuple travels across, e.g., operator graph 400.

Stream performance manager 335 is further configured to analyze the foregoing metadata to identify absolute duplicate or partially duplicate streams in one or more PEs, operator graphs, or compute nodes. More specifically, stream performance manager 335 analyzes the timestamps and IDs included in metadata associated with two or more tuples—along with data attributes of the two or more tuples—to identify similarities between the two or more tuples. For example, if a first tuple indicates that a first processing element processes the first tuple at time X, while a second tuple indicates that a second processing element processes a second tuple at time X, where the first tuple and the second tuple have identical attributes, then the stream performance manager 335 may indicate to a user that a potential processing bottleneck exists due to the presence of duplicate tuples in a data stream.

Figure 5:
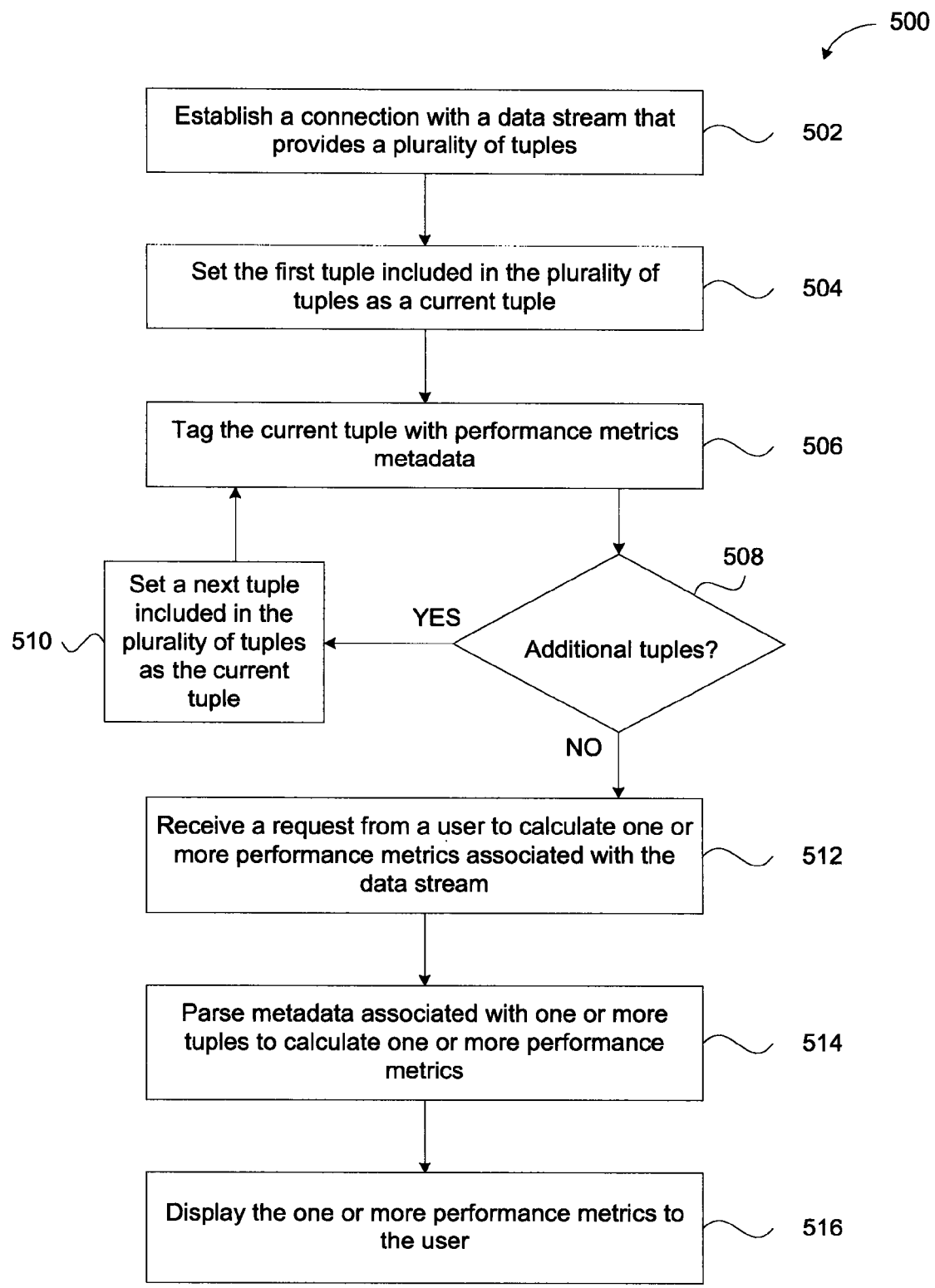
FIG. 5 is a flowchart of a method for calculating one or more performance metrics associated with a data stream, according to an embodiment of the invention.

FIG. 5 is a flowchart of a method 500 for calculating one or more performance metrics associated with a data stream, according to an embodiment of the invention. In one embodiment, the method steps 500 are performed by stream performance manager 335. As shown, the method 500 begins at step 502, where stream performance manager 335 establishes a connection with a data stream that provides a plurality of tuples. At step 504, stream performance manager 335 sets the first tuple included in the plurality of tuples as a current tuple. At step 506, stream performance manager 335 tags the current tuple with performance metrics metadata according to the techniques described above in conjunction with FIG. 4.

At step 508, stream performance manager 335 determines whether additional tuples are included in the plurality of tuples. If, at step 508, stream performance manager 335 determines that additional tuples are included in the plurality of tuples, then method 500 proceeds to step 510, where stream performance manager 335 sets a next tuple included in the plurality of tuples as the current tuple. The method steps 506-510 are repeated until each tuple included in the plurality of tuples has been tagged with performance metrics metadata.

At step 512, stream performance manager 335 receives a request from a user to calculate one or more performance metrics associated with the data stream. This request may be generated, for example, by a user accessing a user interface provided by stream manager 335, where the user is able to select particular performance metrics that he or she is interested in viewing. The user may also specify through the user interface values that narrow the performance metrics, such as IDs of processing elements, operator graphs and compute nodes.

At step 514, stream performance manager 335 parses metadata associated with one or more tuples to calculate one or more performance metrics, such as the performance metrics described above in conjunction with FIG. 4. At step 516, stream performance manager 335 displays the one or more performance metrics to the user via the interface on, e.g., a display device.

Embodiments of the invention provide techniques for determining various performance metrics associated with a stream-based application. In particular, tuples included in a data stream are tagged with metadata as they are processed by the one or more processing elements, which enable a streams performance manager to identify the various performance metrics associated with the data stream. As a result, the various performance metrics may be used to determine the health and performance of the stream-based application and identify potential processing bottlenecks in the stream-based application.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing an application, which, when executed on a processor in a stream-based computing system, performs an operation comprising:

receiving, at a first processing element of a plurality of processing elements of the stream-based computing system that are configured to process data tuples flowing through the stream-based computing system, one or more tuples associated with a first data stream, each of the one or more tuples including a plurality of data attributes;

processing each of the one or more tuples at the first processing element;

for each of the one or more tuples, associating the tuple with respective metadata that includes information related to the processing of the tuple by the first processing element and includes at least a first and a second counter that each correspond to a respective one of the plurality of data attributes of the tuple, wherein the first and second counters indicate a number of times that the corresponding data attribute has changed;

updating, at one or more of the plurality of processing elements that are located downstream of the first processing element, at least one of the first and second counters based on further processing of the one or more tuples by the one or more downstream processing elements;

calculating, after the one or more tuples have flowed through the plurality of processing elements, performance metrics based on the metadata associated with the one or more tuples;

displaying the calculated performance metrics via a user interface on a display device; and automatically adjusting, based on the calculated performance metrics, a configuration of the stream-based computing system.

2. The computer-readable storage medium of claim 1, wherein the metadata information further includes a timestamp, an identification (ID) of the first processing element, an ID of an operator graph in which the first processing element is included, and an ID of a compute node on which the first processing element is executing.

3. The computer-readable storage medium of claim 2, wherein the calculated performance metrics indicate, for each of the one or more tuples received via the first data stream, an amount of time for the first processing element and other processing elements included in the stream-based computing system to process the tuple.

4. The computer-readable storage medium of claim 2, wherein the calculated performance metrics indicate, for each of the one or more tuples received via the first data stream, an amount of time for two or more processing elements included in the stream-based computing system to process the tuple.

5. The computer-readable storage medium of claim 2, wherein the calculated performance metrics indicate an amount of time for each of the one or more tuples to travel through the stream-based computing system.

6. The computer-readable storage medium of claim 2, wherein the calculated performance metrics indicate an amount of time for each of the one or more tuples to travel between two or more compute nodes included in the stream-based computing system.

7. The computer-readable storage medium of claim 2, wherein the calculated performance metrics indicate, for each of the one or more tuples received via the first data stream, a number of times that each processing element, operator graph, and/or compute node included in the stream-based computing system processes the tuple.

8. The computer-readable storage medium of claim 2, wherein the calculated performance metrics indicate, for each of the one or more tuples received via the first data stream, a number of times that each data attribute included in the tuple has been modified.

9. A stream-based computing system, comprising:

a plurality of compute nodes collectively providing a plurality of processing elements for processing data tuples flowing through the stream-based computing system, each compute node comprising a respective processor and a respective memory, wherein the memory stores a stream performance monitor which, when executed on the compute node, is configured to perform an operation for calculating performance metrics, the operation comprising:

receiving, at a first processing element of the plurality of processing elements, one or more tuples associated with a first data stream, each of the one or more tuples including a plurality of data attributes;

processing each of the one or more tuples at the first processing element;

for each of the one or more tuples, associating the tuple with respective metadata that includes information related to the processing of the tuple by the first processing element and includes at least a first and a second counter that each correspond to a respective one of the plurality of data attributes of the tuple, wherein the first and second counters indicate indicating a number of times that the corresponding data attribute has changed;

updating, at one or more of the plurality of processing elements that are located downstream of the first processing element, at least one of the first and second counters based on further processing of the one or more tuples by the one or more downstream processing elements;

calculating, after the one or more tuples have flowed through the plurality of processing elements, performance metrics based on the metadata associated with the one or more tuples;

displaying the calculated performance metrics via a user interface on a display device; and automatically adjusting, based on the calculated performance metrics, a configuration of the stream-based computing system.

10. The system of claim 9, wherein the metadata information further includes a timestamp, an identification (ID) of the first processing element, an ID of an operator graph in which the first processing element is included, and an ID of a compute node on which the first processing element is executing.

11. The system of claim 10, wherein the calculated performance metrics indicate, for each of the one or more tuples received via the first data stream, an amount of time for the first processing element and other processing elements included in the stream-based computing system to process the tuple.

12. The system of claim 10, wherein the calculated performance metrics indicate, for each of the one or more tuples received via the first data stream, an amount of time for two or more processing elements included in the stream-based computing system to process the tuple.

13. The system of claim 10, wherein the calculated performance metrics indicate an amount of time for each of the one or more tuples to travel through the stream-based computing system.

14. The system of claim 10, wherein the calculated performance metrics indicate an amount of time for each of the one or more tuples to travel between two or more compute nodes included in the stream-based computing system.

15. The system of claim 10, wherein the calculated performance metrics indicate, for each of the one or more tuples received via the first data stream, a number of times that each processing element, operator graph, and/or compute node included in the stream-based computing system processes the tuple.

16. The system of claim 10, wherein the calculated performance metrics indicate, for each of the one or more tuples received via the first data stream, a number of times that each data attribute included in the tuple has been modified.

17. A stream-based computing system, comprising:
a plurality of compute nodes collectively providing a plurality of processing elements for processing data tuples flowing through the stream-based computing system, each compute node comprising a respective processor and a respective memory, wherein the memory stores a stream performance monitor which, when executed on the compute node, is configured to perform an operation for calculating performance metrics, the operation comprising:

receiving, at a first processing element of the plurality of processing elements, one or more tuples associated with a first data stream, each of the one or more tuples including a plurality of data attributes;

processing each of the one or more tuples at the first processing element;

for each of the one or more tuples, associating the tuple with respective metadata that includes information related to the processing of the tuple by the first processing element and includes at least a first and a second counter that each correspond to a respective one of the plurality of data attributes of the tuple and indicate a number of times that the respective data attribute has changed;

updating, at one or more of the plurality of processing elements that are located downstream of the first processing element, at least one of the first and second counters based on further processing of the one or more tuples by the one or more downstream processing elements;

calculating, after the one or more tuples have flowed through the plurality of processing elements, performance metrics based on values of the first and second counters associated with each of the one or more tuples; and based on the calculated performance metrics, automatically modify a configuration of a plurality of processing elements that are executing on the plurality of compute nodes.

18. The system of claim 17, wherein automatically modifying a configuration of a plurality of processing elements comprises moving one or more processing elements from a first compute node to a second compute node.

* * * * *